United States Patent
Stein et al.

(10) Patent No.: US 8,477,445 B2
(45) Date of Patent: Jul. 2, 2013

(54) WRITE CLOCK SYNCHRONIZATION APPARTUS FOR MAGNETIC RECORDING DISK DRIVES WITH PATTERNED MEDIA

(71) Applicant: Guzik Technical Enterprises, Mountain View, CA (US)

(72) Inventors: Anatoli B. Stein, Atherton, CA (US); Semen P. Volfbeyn, Milpitas, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 0 days.

(21) Appl. No.: 13/706,311

(22) Filed: Dec. 5, 2012

(65) Prior Publication Data
US 2013/0141812 A1    Jun. 6, 2013

Related U.S. Application Data

(60) Provisional application No. 61/567,312, filed on Dec. 6, 2011.

(51) Int. Cl.
*G11B 5/09* (2006.01)
(52) U.S. Cl.
USPC .......................................................... 360/51
(58) Field of Classification Search
None
See application file for complete search history.

(56) References Cited

U.S. PATENT DOCUMENTS

| | | | | |
|---|---|---|---|---|
| 7,675,703 B2 * | 3/2010 | Albrecht et al. | ............... | 360/51 |
| 7,864,471 B2 * | 1/2011 | Sridhara et al. | ............... | 360/51 |
| 7,911,724 B2 * | 3/2011 | Buch et al. | ............... | 360/51 |
| 8,035,910 B2 * | 10/2011 | Mallary et al. | ............... | 360/51 |
| 2008/0304173 A1 * | 12/2008 | Albrecht et al. | ............... | 360/51 |

* cited by examiner

*Primary Examiner* — Daniell L Negron
(74) *Attorney, Agent, or Firm* — Pierce Atwood LLP; Joseph M. Maraia

(57) ABSTRACT

A write clock generator for use in writing data to a rotating patterned magnetic media disk is disclosed. The generator includes a magnetic read head for generating a succession of servo signals representative of succession of servo magnetization patterns detected from a corresponding succession of arcuate sectors along a circular data track on the disk. A preamble processor generates a corresponding succession of sector pair signals representative of the lengths of adjacent sectors along the data track on a rolling pair-wise basis. A next sector length predictor processor determines for a succession of pairs of sectors, a length ratio of the lengths of the sectors in the respective pairs of sectors. A clock generator generates a periodic clock for each sector of the succession of sectors, wherein the clock rate associated with a current sector has an associated phase deviation relative to a clock rate associated with a previous sector, which is proportional to the length ratio for the current sector and the previous sector.

8 Claims, 1 Drawing Sheet

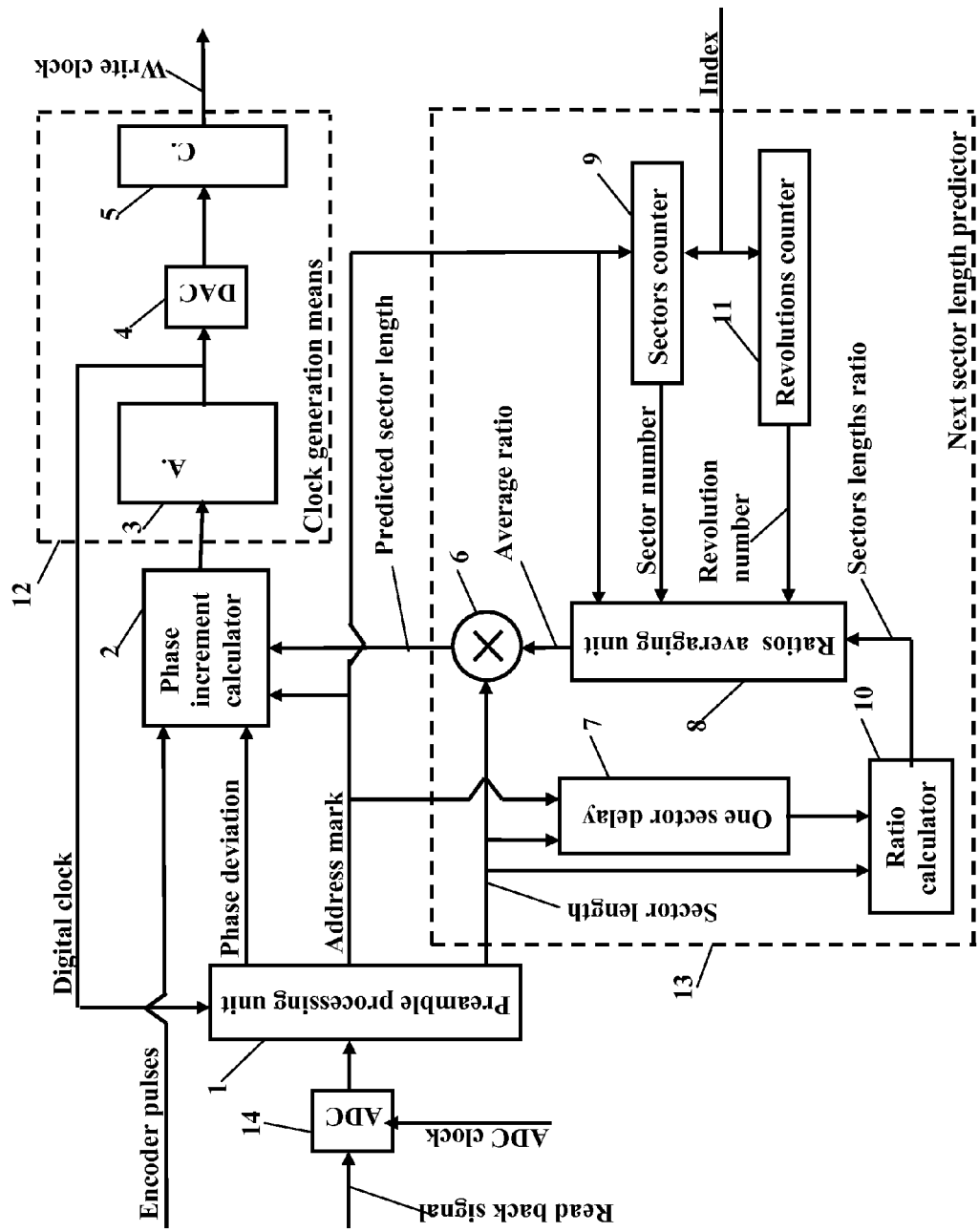

WRITE CLOCK SYNCHRONIZATION APPARTUS FOR MAGNETIC RECORDING DISK DRIVES WITH PATTERNED MEDIA

RELATED APPLICATION(S)

This application claims the benefit of U.S. Provisional Application No. 61/567,312, filed on Dec. 6, 2011. The entire teachings of the above application is incorporated herein by reference.

FIELD

This invention relates generally to magnetic recording hard disk drives with patterned media and more particularly to write clock synchronization in such drives.

BACKGROUND

Magnetic recording with patterned media was proposed to increase the data density in of hard disk drives. In patterned media hard drives, magnetic material on a disk is "patterned" in small isolated islands, each island being separated from neighboring islands by a non-magnetic region. When data of a digital signal are written to a disk bearing patterned media, the transitions between bits of the digital signal should occur only between islands, and the individual bits of data should be written only to the islands. To assure such operation, a write head must be precisely aligned with the islands of the patterned media so that the data are correctly written to the patterned data islands. Moreover, such operation requires a relatively high level of synchronization of a write clock signal with the motion of the data islands as the disc rotates, compared to the level of synchronization required for writing data to non-patterned magnetic media.

A conventional magnetic recording hard disk with non-patterned magnetic media, has a set of concentric data tracks. Each data track is divided into a plurality of circumferentially spaced sectors. The beginning of each sector is marked by a servo header (magnetization pattern) that contains a synchronization field (a preamble). In use, the servo headers are read by a magnetic read head and the read information of the servo headers is used by way of servo electronics for various purposes. More particularly, the preambles are followed by positioning information used by servo electronics to move the head to desired data tracks and to keep the head centered on the various data tracks as required. The servo preambles and the following positioning information are written to the disk once, typically during the manufacturing or formatting of the disk, and are not be erased during normal operation of the disk drive. A synchronization system for synchronizing operation of disk drives with patterned media, generally use the servo preambles for adjustment of the phase and the frequency of a write clock signal used to effect the writing of data to the disk.

In the prior art, a main problem in the design of the synchronization systems, has been the construction of a synchronization system which is capable of establishing and maintaining "correct" phase and frequency of the write clock signal (referred to below as the "write clock") over the entire interval between adjacent servo preambles. The term "correct" is used in the sense that "correct" write clock signals for application to a write head, have a frequency and phase synchronized with the rotation of a disk which is appropriate to effect writing of data bits only to the magnetic islands, while inter-bit transitions occur between the islands, on a data track. There are several US patents representative of the prior art, which suggest different approaches to that problem.

A method of detecting write clock synchronization error (resulting in deleted or inserted bits in a read back signal) is described in U.S. Pat. No. 8,035,910. In the '910 patent, an arrangement is disclosed that utilizes both a read head and a write head. In that arrangement, the read head trails the write head as the disk rotates. The write head writes a symbol and the read head reads a just-written symbol. The symbol that has been read is compared with the symbol that was to have been written, and when the read symbol does not match the written symbol, synchronization error is deemed to have occurred.

In U.S. Pat. No. 7,864,471, it is proposed to correct synchronization errors by use of error-correcting codes. A short inner modulation code transforms synchronization error into bit substitution errors, which are removed by a longer outer error-correcting code.

A disadvantage of both the '910 patent and the '471 patent is connected to the fact that immediately before and after synchronization error, there is phase misalignment in the write clock signal with respect to the islands of the patterned media. As a result, the bit error rate rises in the corresponding time intervals and that rise cannot be tolerated.

U.S. Pat. No. 7,911,724 describes a write clock synchronization apparatus, where a needed phase adjustment accuracy is provided by inserting additional synchronization fields between successive servo preambles. A calibration signal is written to each of the synchronization fields, where the calibration signal has a frequency that is offset from the nominal island's frequency of a patterned media. Reading the calibration signal and mixing it with a reference periodic signal creates a possibility to determine the needed phase correction of the write clock. A disadvantage of such synchronization apparatus is the necessity of additional synchronization fields, insertion of which reduces the area of the disk available for data recording.

A prior art synchronization apparatus that is free of the disadvantages of the patents described above, is proposed in U.S. Pat. No. 7,675,703. The apparatus of the '703 patent includes a counter for counting the integer number of write clock cycles between successive servo preambles, and further includes a phase detector for measuring the phase difference between the servo preamble and a reference signal. The total time between successive servo preambles (servo sector length) is determined by combining the counter reading with the measured phase difference. The calculated servo sector length is compared to a nominal value and the difference is used as an indicator of the write clock timing (i.e., synchronization) error. A Kalman filter is used as a state estimator. The Kalman filter receives the timing error as an input value and calculates timing parameters of the write clock according to a state estimation algorithm. The calculated timing parameters proceed to write clock control logic which establishes correct phase and frequency of the generated write clock.

However, one of the factors that affect the accuracy of a write clock synchronization apparatus, is the instability of the hard disk angular speed, or rate of rotation. Changes of the angular speed during one revolution are primarily due to eccentricity of the circular data tracks with respect to the actual center of rotation ("repeatable runout"). By keeping a history of write clock frequency error for a number of disk revolutions, the synchronization apparatus can determine the repeatable error components and compensate them during write operation. In contrast to the repeatable run out, the slow fluctuations of the spindle speed of a disk drive, with changes from one revolution to another, are of erratic nature and cannot be compensated.

The synchronization apparatus described in '703 patent uses the difference between the measured sector length and its nominal value as a timing error—a source for the needed correction of write clock phase and frequency. Since the measurement of the servo sector length inevitably contains an error due to changes of the angular speed, the instability of the disk angular speed makes detrimental impact on the apparatus operation, constraining the achievable synchronization accuracy.

The goal of present invention is to create a write clock synchronization apparatus that is unaffected by the hard disk angular speed instability and, in that way, to enhance the accuracy of the apparatus operation.

SUMMARY

An apparatus for generating a write clock signal for writing data to a magnetic recording disk bearing patterned media is provided. In a form, the disk includes on a surface transverse to and disposed about a central axis, a plurality of concentric circular data tracks disposed about the central axis.

An apparatus for generating a write clock signal for writing data to a magnetic recording disk bearing patterned media is provided. In a form, the disk includes on a surface transverse to and disposed about a central axis, a plurality of concentric circular data tracks disposed about the central axis.

Each data track includes a plurality of arcuate sectors. Each sector in a data track includes a plurality of islands of a relatively magnetizable material mutually separated in a circumferential direction along the data track, by a region of relatively non-magnetizable material. Each island is adapted to be characterized by magnetization representative of a bit of data written to the disk.

At least two of the sectors of the data tracks are characterized by a preamble followed by an address mark demarking a following data field. The preamble includes a magnetic pattern detectable by a magnetic read head overlying the sectors during passage of the data track past the read head during rotation of the disk about the central axis. The preambles of the sectors are indicative the lengths of the respective sectors.

Generally, the apparatus includes a magnetic read head, a preamble processor, a next sector length predictor processor, and a clock generator.

In a form, the magnetic read head generates a succession of preamble signals representative of a succession of preamble magnetization patterns detected from a corresponding succession of arcuate sectors along a circular data track on the disk.

The preamble processor is responsive to the succession of preamble magnetization patterns to generate a corresponding succession of sector pair signals. The respective sector pair signals are representative of the lengths of adjacent sectors along the data track on a rolling pair-wise basis.

The next sector length predictor processor is responsive to the succession of sector pair signals, to determine for a succession of pairs of sectors, a length ratio of the lengths of the sectors in the respective pairs of sectors.

The clock generator generates a periodic clock for each sector of the succession of sectors. The clock rate associated with a current sector has an associated phase deviation relative to a clock rate associated with a previous sector which is proportional to the length ratio for the current sector and the previous sector.

In an embodiment, a preamble processor is operative as the disk rotates about the central axis with a magnetic read head overlying a data track.

The preamble processor receives a succession of digital preamble signals representative of a corresponding succession of preambles read from the disk by the read head. In response to the received digital preamble signal for each preamble and a digital clock determined from a previous digital preamble signal associated with a previous sector, the preamble processor generates an address mark associated with a current digital preamble signal. The address mark is representative of a first location following the preamble in the sector to which a bit of data is to be written to the current sector.

The preamble processor also generates a sector length signal representative of a length associated with the current digital preamble signal associated with the current sector, and The preamble processor also generates a phase deviation value associated with the current digital preamble signal, wherein the phase deviation value is representative of a difference in phase associated with the current digital preamble signal associated with the current sector, with respect to the phase of the digital clock, A next sector length predictor processor is operative for a current received digital preamble signal associated with a current sector. The next sector length predictor processor stores a current sector length (CSL) value representative of the length signal for the associated current sector. The next sector predictor processor also accesses a stored CSL value for a previous sector.

From the CSL value for the current sector and the accessed CSL value for the previous sector, the next sector predictor processor determines a sector ratio value representative of the ratio of the stored current CSL value for the current sector, to the accessed CSL value for the previous sector.

The next sector length predictor processor updates and maintains a rolling average of the sector ratio value over a plurality of revolutions of the disk.

The next sector length predictor processor generates a predicted next sector length value corresponding the product of the sector length of the current sector and the current rolling average of the sector ratio value, A phase adjustment determination network is responsive to (i) the phase deviation value associated with the digital preamble signal for the current sector, (ii) an applied disk position encoder signal representative of the angular position of the disk, (iii) the address mark associated with the digital preamble signal for the current sector, and (iv) the predicted next sector length value.

The phase adjustment determination network generates a phase increment value associated with the next sector. The phase increment value is representative of a change in phase to be applied to the digital clock for application to the preamble processor for a digital preamble associated with the next sector for a then-current rotational rate of the disk.

A write clock generator is responsive to the phase increment value to generate a data write clock signal for data to be written to a next sector.

BRIEF DESCRIPTION OF THE DRAWINGS

The FIGURE shows in block diagram form, an exemplary write clock synchronization apparatus in accordance with the invention.

DETAILED DESCRIPTION

A magnetic disk supported on a spindle in a disk drive, ideally is driven to rotate at a constant rotational speed during operation. In practice, however, the rotational speed of a spindle of a disk drive, and thus a disk supported on the drive, varies with time, although the variation is relatively slow. At typical disk rotation rates, it takes tens of microseconds for a write head to "fly" over several servo sectors during a disk revolution. The change of the spindle speed is negligibly small during this time interval.

The physical length of a sector and the physical length of that sector's adjacent sectors, are rigidly bound. However, the length of time that it takes each such sector of a rotating disk, to pass a fixed reference point, such as an overlying magnetic head, may vary from one disk revolution to another, due to variations in angular speed of the disk. The respective durations associated with adjacent sectors passing the magnetic head, i.e., the "temporal lengths" associated with adjacent sectors on a data track, remain in proportion from revolution to revolution (except for minor intra-revolution changes). Consequently the ratio of "temporal lengths" for adjacent sectors on a data track, as well as for "near adjacent" sectors, is substantially constant. In some cases, where a change in spindle rotational rate does not vary significantly over two, or some other relatively small number of revolutions, the ratio of temporal lengths of positionally-related (e.g., adjacent or near-adjacent) sectors even over two, or some other relatively small number of, revolutions, is substantially fixed.

In the remainder of the below text, the "temporal length" of a sector (as distinguished from "physical length" of a sector) is referred to simply as the "length" of a sector, in keeping with the practice in the art. Also, the terms "processing unit" and "processor" are used interchangeably below.

The present invention is based on the fact that the ratio of a sector's length to the length of the immediately preceding sector (or a "near adjacent" sector), does not depend on the changes of the disk rotational rate in a significant manner. The repeated measuring of the ratio of a sector length to the length of a preceding (or near-preceding) sector, accumulation of the measurement results and calculation of the average ratio for each position of a sector on the disk (the averaging being done over a number of revolutions), creates an objective description of sectors' distribution on the disk. That description is substantially free from distortions caused by fluctuations of the disk rotational rate. The average ratios of lengths permits is used to predict, the length of the next (or near-next) sector and to determine a frequency of write clock that should be established for the next sector.

A block diagram of an exemplary embodiment of a write clock synchronization apparatus 00 for magnetic recording disk drives with patterned media according to the present invention, is shown in FIG. 1.

For use with the write clock synchronization apparatus 00, a read back signal is generated by a magnetic read head as a disk passes under the read head during rotation of the disk. The read back signal is applied to a data input of an analog to digital converter (ADC) 14 of the write clock synchronization apparatus 00. An ADC clock is produced by a stable local oscillator (not shown in FIG. 1) and is applied to a clock input of ADC 14. A digital signal from an output of ADC 14 is applied to an input of a preamble processing unit 1. A clock input of preamble processing unit 1 receives a digital clock, which is generated inside the write clock synchronization apparatus 00 (the generation of the digital clock is described below). In response to the applied digital signal from an output of ADC 14 and the digital clock, preamble processing unit 1 generates a succession of address marks (pulses) demarking the data fields for the respective succession of preambles read from the rotating disk, and a phase deviation signal representative of a succession of phase deviations associated with the data fields demarked by the respective address marks.

In general, the write clock synchronization apparatus 00 operates to bring the phase and frequency of the digital clock close to phase and frequency of the respective preambles. To do so, the preamble processing unit 1 detects the succession of preambles in the read back signal, as well as address marks (pulses) demarking the data fields for the respective preambles. Following processing of a first address mark, and after a "next" address mark is detected, a pulse is produced on the address mark output. A phase detector, incorporated in the preamble processing unit 1, measures phase deviation of the digital clock from a preamble clock derived from the current preamble. The measurement result is placed on the phase deviation output of the preamble processing unit 1.

The preamble processing unit 1 contains a counter that is advanced by the ADC clock. The number of ADC clock cycles between two adjacent preambles produces a coarse estimation of the corresponding time interval. Combining the counter reading with the phase deviation, found by the phase detector, an accurate value of the time interval between the two preambles is calculated. The calculation result is placed on a sector length output of the preamble processing unit 1.

The so-determined sector length is delayed until the next address mark in a one sector delay element 7. The one sector delay element 7 consists of a register that is clocked by the address marks coming from the preamble processing unit 1, and which keeps the determined sector length up to the end of the next sector. The ratio calculator 10 receives the length of the current sector from the sector length output of the preamble processing unit 1 and the length of the preceding sector from the output of one sector delay element 7. The result of dividing the current sector length by the preceding sector length (the length ratio for the currently processed sector and that of the next previous sector) is produced at the output of the ratio calculator 10.

A sector counter 9 is set to zero by Index pulses and is advanced by the address marks received from the preamble processing unit 1. The output of the sector counter 9 is representative of a reference number associated with a current sector inside a disk revolution. For a current sector, the reference number is applied to a ratio averaging unit 8. A revolutions counter 11 is set to zero at the start of operation and is advanced by the Index pulses. The output of the revolutions counter 11 is representative of the number of the current revolution. That value is applied to the ratio averaging unit 8.

The ratio averaging unit 8 contains a ratio memory with a number of cells that equals the number of sectors in a revolution. After receiving a next address mark (from the preamble processing unit 1) the ratio averaging unit 8 refreshes the average ratio that is stored in the ratio memory cell with an address equal to the current sector number (received from the sector counter 9). A new value of the average ratio is derived from the old value of the average ratio (that have been stored in the memory), the current ratio (that comes from the ratio calculator 10) and the revolution number N (that comes from the revolution counter 11) according to:

$$\text{NewAverageRatio} = (\text{OldAverageRatio} \cdot (N-1) + \text{CurrentRatio})/N.$$

The output of the ratio averaging unit 8 at any instant holds the average ratio that is kept in the ratio memory cell with the address equal to the next sector number (the current sector number, received from the sector counter 9 and incremented by one).

A multiplier 6 receives the length of the current sector from the sector length output of the preamble processing unit 1. At the same time, multiplier 6 receives from the ratio averaging unit 8 the average ratio of the length of the next sector to the length of the current sector. The product of these two quantities equals the expected length of the next sector i.e., the predicted sector length).

The assembly of one sector delay element 7, ratio calculator 10, ratio averaging unit 8, multiplier 6, sector counter 9 and revolution counter 11, forms the next sector length predictor 13.

A clock generator 12 receives a phase increment value from a phase increment calculator 2 and produces a corresponding write clock. The phase increment PI determines the change of the write clock phase during one cycle of the ADC clock. The clock generator 12 comprises a numerical oscillator 3, a digital-to-analog converter (DAC) 4 with a following low pass filter (not shown in the FIG. 1) and an analog phase locked loop (PLL) 5.

The phase increment calculator 2 calculates the phase increment PI according to an algorithm that is easily understood by those skilled in the art. In a simple case, the write clock synchronization apparatus 00 operates like a phase locked loop, smoothing the errors of phase deviation measurement with a time constant TC. After each address mark, the phase increment calculator 2 sets at its output, phase increment PI and keeps that value during the entire sector up to the next address mark. The phase increment PI is derived from the preamble phase deviation $\Delta\phi$ (from the preamble processing unit 1), the predicted sector length L (from the next sector length predictor) and the nominal number M of the write clock cycles in a sector (a constant value known beforehand) according to the next equation:

$$PI = (2\pi \cdot M + \Delta\phi/TC)/L$$

In some forms, the write clock synchronization apparatus 00 meets additional requirements and eliminates the possibility of frequency jumps, no matter how small they may be. In that case, in each ADC clock cycle, phase increment calculator 2 produces at its output, phase increment PI that differs from the phase increment produced in the preceding cycle, by addition a value $\Delta PI$. The value $\Delta PI$ is determined from:

$$\Delta PI = (2\pi \cdot M + \Delta\phi/TC)/(L \cdot (L-1)/2) - PI0/((L-1)/2)$$

where PI0 is a value of the phase increment at the instant of appearance of the last address mark.

The operation of the numerical oscillator 3 is based on the use of the ADC clock. The numerical oscillator 3 contains an accumulator that accumulates the phase of the write clock, increasing it at each ADC clock edge by the phase increment. The accumulated phase is transferred to a unit with a lookup table, where it is transformed into a sample of a sine wave.

The output of the numerical oscillator 3 is connected to the digital clock input of the preamble processing unit 1 and to the input of DAC 4. DAC 4 converts the sequence of digital samples into analog signal.

The frequency of the preamble clock and of the digital clock is usually less than the needed frequency of the write clock. The analog PLL 5 receives a sine wave from the output of DAC 4, multiplies its frequency, smoothes its phase and produces the write clock at the output of the synchronization apparatus 00. The write clock is used for writing data to a magnetic recording disk bearing patterned media.

A hard disk drive incorporates an encoder, mounted on the spindle shaft. The encoder produces the Index pulses and, also, encoder pulses, these pulses being uniformly distributed between the Index pulses. The number of encoder pulses in one revolution is far greater than the number of sectors, so that each sector contains a plurality of encoder pulses. In one embodiment of the present invention, the encoder pulses from the encoder are fed into the phase increment calculator 2. The phase increment calculator 2 uses the encoder pulses to detect the spindle angular speed variations and to correct correspondingly the write clock phase inside a sector.

Although invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A write clock synchronization apparatus for magnetic recording disk drives with patterned media comprising:
   A. an analog to digital converter (ADC) for receiving an analog read back signal from a magnetic read head, and converting the analog read back signal into a digital read back signal;
   B. a preamble processor having a read back signal input coupled to receive the digital read back signal, a digital clock input, an address mark output, a phase deviation output, and a sector length output, wherein said preamble processor is operative to:
      i. detect preambles and address marks in the read back signal,
      ii. generate address mark (AM) pulses indicative of the detection of an occurrence of address marks in the read back signal, and apply the AM pulses to the address mark output,
      iii. derive a preamble clock from the respective preambles and for each preamble clock, determine a phase deviation between the preamble clock and a digital clock at the digital clock input, and apply the respective phase deviations on the phase deviation output; and
      iv. for each detected preamble, determine a length value representative of a time interval between detection of a current preamble and a detection of a preceding preamble, and apply the respective length values on the sector length output;
   C. a next sector length predictor having a sector length input, an address mark input, an index input, and a predicted sector length output, wherein said sector length predictor is operative for a current detected preamble, to:
      i. calculate a ratio of a length value for a previous sector to a length value for the current sector,
      ii. determine an average ratio value for each sector during a revolution of the disk,
      iii. determine a next sector predicted length value representative of a product of the current sector length by the corresponding average ratio on the output, and apply the next sector predicted length value on the predicted sector length output,
   D. a phase increment calculator responsive to the address mark and the phase deviation from the preamble processor and next predicted sector length from the next sector length predictor, and operative to generate a phase increment value at a calculator output; and
   E. a clock generator responsive to the phase increment value from the phase increment calculator output, and operative to:
      i. generate the digital clock and apply the digital clock to the digital clock input of the preamble processor, and
      ii. generate an analog write clock signal at a write clock output,
      wherein the phase and the frequency of the digital clock and the analog write clock signal are determined by the phase increment value.

2. A write clock synchronization apparatus according to claim 1, wherein the next sector length predictor comprises:
  A. a one sector delay element having an input connected to the sector length input of the next sector length predictor, an address mark input connected to the address mark output of the preamble processor, and a one sector delay output that repeats the input value with a delay, equal to the duration of one sector;
  B. a ratio calculator having a ratio calculator output, and is operative to apply a ratio value on the ratio calculator output, wherein the ratio value is representative of the ratio of a value received from the sector length input of the next sector length predictor, to a value received from the one sector delay output of one sector delay element;
  C. a sectors counter operative to reset to zero in response to applied index pulses, and to increment in response to AM pulses received from the AM output of the preamble processor;
    and applies to a sectors counter output, a sector number value corresponding to the position of the current sector in a revolution of the disk;
  D. a revolutions counter operative to reset to zero prior to receipt of a read back signal, increment by received index pulses, and apply to a revolutions counter output, a revolution value representative of the number of revolutions of the disk since receipt of a first read back signal;
  E. a ratio averaging unit operative in response to received AP pulses, the sector number value from the sectors counter, the revolution value from the revolutions counter, the sectors lengths ratio value from the ratio calculator, and at an average output, and average ratio value representative of the next sector length to the current sector length; and
  F. a multiplier operative to calculate a next sector predicted length value representative of a product of the current sector length received from the sector length input of the next sector length predictor and the average ratio value received from the ratio averaging unit, and to apply the next sector predicted length value on a predicted next sector length output.

3. A write clock synchronization apparatus according to claim 1, wherein clock generator comprises:
  A. a numerical oscillator operative to generate at an oscillator output, a digital sine wave having a frequency corresponding to the preamble clock of a previous sector with a phase shift corresponding to the phase deviation for a current sector; wherein the oscillator output is connected to the digital clock input of the preamble processor;
  B. a digital to analog converter (DAC) coupled to the oscillator output and responsive to the digital sine wave to generate a corresponding analog sine wave on a DAC output; and
  C. an analog phase locked loop (PLL) coupled to the DAC output and responsive to the analog sine wave to tracks the phase of the analog sine wave, and generate the applies a resultant analog signal on a write clock output.

4. A write clock synchronization apparatus according to claim 1, wherein the phase increment calculator derives a phase increment PI from a preamble phase deviation $\Delta\phi$, a predicted sector length L, a time constant TC and a nominal number M of write clock cycles in a sector according to:

$$PI=(2\pi \cdot M+\Delta\phi/TC)/L.$$

5. A write clock synchronization apparatus according to claim 1, wherein the phase increment calculator is operative during each clock cycle of the ADC, to produce at the calculator output, a phase increment PI that differs from the phase increment produced in a next previous preceding clock cycle of the ADC, by addition a value $\Delta PI$, wherein:

$$\Delta PI=(2\pi \cdot M+\Delta\phi/TC)/(L\cdot(L-1)/2)-PI0/((L-1)/2),$$

where $\Delta\phi$ is a phase deviation associated with a current preamble determined by the preamble processor for the current sector, L is the predicted sector length L determined by the next sector length predictor, TC is a time constant, M is a nominal number of the write clock cycles in a sector and PI0 is a value of the phase increment at the occurrence of a next previous address mark pulse.

6. A write clock synchronization apparatus according to claim 1, wherein the phase increment calculator is responsive to applied encoder pulses from a spinstand spindle rotation encoder to determine angular speed variations of a spindle during a sector.

7. An apparatus for generating a write clock signal for writing data to a magnetic recording disk bearing patterned media, wherein the disk includes on a surface transverse to and disposed about a central axis:
  a plurality of concentric circular data tracks disposed about the central axis,
    wherein each data track includes a plurality of arcuate sectors wherein each sector in a data track includes a plurality of islands of a relatively magnetizable material mutually separated in a circumferential direction along the data track by a region of relatively non-magnetizable material, wherein each island is adapted to be characterized by magnetization representative of a data bit written to the disk, and
    wherein at least two of the sectors of the data tracks are characterized by a preamble followed by an address mark demarking a following data field, wherein the preamble includes a magnetic pattern detectable by a magnetic read head overlying the sectors during passage of the data track past the read head during rotation of the disk about the central axis, to indicate the lengths of the respective sectors,
  comprising:
  A. a preamble processor
    operative as the disk rotates about the central axis with a magnetic read head overlying a data track, to:
      receive a succession of digital preamble signals representative of a corresponding succession of preambles read from the disk by the read head, and
    operative in response to the received digital preamble signal for each preamble and a digital clock determined from a previous digital preamble signal associated with a previous sector, to:
      generate an address mark associated with a current digital preamble signal, wherein the address mark is representative of a first location following the preamble in the sector to which a bit of data is to be written to the current sector,
      generate a sector length signal representative of a length associated with the current digital preamble signal associated with the current sector, and
      generate a phase deviation value associated with the current digital preamble signal, wherein the phase deviation value is representative of a difference in phase associated with the current digital preamble signal associated with the current sector, with respect to the phase of the digital clock,
  B. a next sector length predictor processor
    operative for a current received digital preamble signal associated with a current sector, to:

store a current sector length (CSL) value representative of the length signal for the associated current sector, access a stored CSL value for a previous sector, determine a sector ratio value representative of the ratio of the stored current CSL value for the current sector, to the accessed CSL value for the previous sector, update and maintain a rolling average of the sector ratio value over a plurality of revolutions of the disk, and generate a predicted next sector length value corresponding the product of the sector length of the current sector and the current rolling average of the sector ratio value, C. a phase adjustment determination network responsive to (i) the phase deviation value associated with the digital preamble signal for the current sector, (ii) an applied disk position encoder signal representative of the angular position of the disk, (iii) the address mark associated with the digital preamble signal for the current sector, and (iv) the predicted next sector length value, and operative to:

generate a phase increment value associated with the next sector, wherein the phase increment value is representative of a change in phase to be applied to the digital clock for application to the preamble processor for a digital preamble associated with the next sector for a then-current rotational rate of the disk, D. a write clock generator responsive to the phase increment value to generate a data write clock signal for data to be written to a next sector.

8. An apparatus for generating a write clock for use in writing data to a rotating patterned magnetic media disk, comprising:

A. a magnetic read head for generating a succession of preamble signals representative of succession of preamble magnetization patterns detected from a corresponding succession of arcuate sectors along a circular data track on the disk, B. a preamble processor responsive to the succession of preamble magnetization patterns to generate corresponding succession of sector pair signals representative of the lengths of adjacent sectors along the data track on a rolling pair-wise basis, C. a next sector length predictor processor responsive to the succession of sector pair signals, to determine for a succession of pairs of sectors, a length ratio of the lengths of the sectors in the respective pairs of sectors, D. a clock generator for generating a periodic clock for each sector of the succession of sectors, wherein the clock rate associated with a current sector has an associated phase deviation relative to a clock rate associated with a previous sector which is proportional to the length ratio for the current sector and the previous sector.

* * * * *